United States Patent
Fee et al.

(10) Patent No.: US 7,779,460 B2
(45) Date of Patent: Aug. 17, 2010

(54) PARTIAL GRANT SET EVALUATION FROM PARTIAL EVIDENCE IN AN EVIDENCE-BASED SECURITY POLICY MANAGER

(75) Inventors: Gregory D. Fee, Seattle, WA (US); Brian Pratt, Seattle, WA (US); Sebastian Lange, Ziessau (DE); Loren Kohnfelder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 11/736,295

(22) Filed: Apr. 17, 2007

(65) Prior Publication Data
US 2007/0192839 A1   Aug. 16, 2007

Related U.S. Application Data

(63) Continuation of application No. 10/162,260, filed on Jun. 5, 2002, now Pat. No. 7,207,064, which is a continuation-in-part of application No. 09/598,534, filed on Jun. 21, 2000, now Pat. No. 7,051,366.

(51) Int. Cl.
G06F 9/00 (2006.01)
G06F 17/30 (2006.01)
(52) U.S. Cl. ................. 726/14; 726/6; 726/27
(58) Field of Classification Search .......... 726/14, 726/6, 27
See application file for complete search history.

(56) References Cited

U.S. PATENT DOCUMENTS 5,644,755 A * 7/1997 Wooten .................. 703/23
5,915,085 A    6/1999 Koved
5,958,050 A    9/1999 Griffin et al.
5,978,484 A    11/1999 Apperson et al.

(Continued)

FOREIGN PATENT DOCUMENTS

WO    WO 99/30217    6/1999

OTHER PUBLICATIONS

Anand, R. et al., "A Flexible Security Model for Using Internet Content," Proceedings of the 16th Symposium on Reliable Distributed Systems. SRDS '97, Durham, NC & Proceedings of the Symposium on Reliable Distributed Systems, Los Alamitos,CA: IEEE Computer Soc, US (Oct. 22-24, 1997).

(Continued)

*Primary Examiner*—Kambiz Zand
*Assistant Examiner*—William S Powers
(74) *Attorney, Agent, or Firm*—Merchant & Gould P.C.

(57) ABSTRACT

An evidence-based policy manager generates a permission grant set for a code assembly received from a resource location. The policy manager executes in a computer system (e.g., a Web client or server) in combination with the verification module and class loader of the run-time environment. The permission grant set generated for a code assembly is applied in the run-time call stack to help the system determine whether a given system operation by the code assembly is authorized. The policy manager may determine a subset of the permission grant set based on a subset of the received code assembly's evidence, in order to expedite processing of the code assembly. When the evidence subset does not yield the desired permission subset, the policy manager may then perform an evaluation of all evidence received.

16 Claims, 12 Drawing Sheets

U.S. PATENT DOCUMENTS

| | | | |
|---|---|---|---|
| 6,044,466 | A | 3/2000 | Anand et al. |
| 6,044,467 | A | 3/2000 | Gong |
| 6,052,678 | A | 4/2000 | Itoh et al. |
| 6,125,447 | A * | 9/2000 | Gong .......................... 726/17 |
| 6,463,535 | B1 | 10/2002 | Drews |
| 6,687,823 | B1 | 2/2004 | Al-Salqan et al. |
| 6,981,281 | B1 | 12/2005 | LaMacchia et al. |
| 7,051,366 | B1 | 5/2006 | LaMacchia et al. |
| 7,131,143 | B1 | 10/2006 | LaMacchia et al. |
| 7,207,064 | B2 | 4/2007 | Fee et al. |

OTHER PUBLICATIONS

"Compliance Checking in the PolicyMaker Trust Management System," by Blaze, Feigenbaum and Strauss, AT&T Labs-Research (Publicly known as prior art at least as early as Jun. 21, 2000).

"Decentralized Trust Management," by M. Blaze, J. Feigenbaum, J. Lacy, in Proceedings of the 1996 IEEE Symposium on Security and Privacy, pp. 164-173. Also available as a DIMACS Technical Report. This paper describes PolicyMaker. Available in Postscript at http://www.research.att.com/~jf/pubs/oakland96proc.ps (1996).

Information on KeyNote including "The KeyNote Trust-Management System" from RFC 2704, at http://www.cis.upenn.edu/~angelos/keynote.html; and "Using the KeyNote Trust Management System" by Matt Blaze, at http://www.crypto.com/trustmgt/ (Date Printed Jan. 2, 2001).

International Search Report for PCT/US01/16057.

International Search Report for PCT/US01/16127.

"Logically Extensible Privilege Control Set," IBM Technical Disclosure Bulletin, IBM Corp., New York, NY, vol. 34, No. 7B (Dec. 1, 1991).

"Managing Trust in an Information-Labeling System," European Transactions on Telecommunications, 8, pp. 491-501. (Special issue of selected papers from the 1996 Amalfi Conference on Secure Communication in Networks.) Postscript from http://www.research.att.com/~jf/pubs/ett97.ps (1997).

"Proceedings of the Sixth International World Wide Web Conference," Santa Clara, CA, by Y. Chu, J. Feigenbaum, B. LaMacchia, P. Resnick, M. Strauss, Referee: Trust Management for Web Applications. Available from http://www.farcaster.com/papers/www6-referee/index.htm (Apr. 1997).

"Program Specialization and Partial Evaluation," 3 pages printed from http://www.diku.dk/research-groups/topps/activities/PartialEvaluation.html (Date Printed Mar. 3, 2002).

Scott Oaks, Java Security, 0"Reilly & Associates, Inc., pp. 62-123 (May 1998).

"The Evolution of Java Security," by Koved, Nadalin, Neal and Lawson, including information on Java-based systems, IBM. (1998).

"The Role of Trust Management in Distributed System Security," M. Blaze, J. Feigenbaum, J. Ioannidis, A. Keromytis, Secure Internet Programming: Security Issues for Distributed and Mobile Objects, Lecture Notes in Computer Science, vol. 1603, Springer, Berlin, pp. 185-210. Postscript available from http://www.research.att.com/~jf/pubs/sip99.ps (1999).

"Trust management on the World Wide Web," by Khare and Rifkin, at http://www7.scu.edu.au/programme/posters/1902/com1902.htm (Date Printed Jan. 2, 2001).

* cited by examiner

PARTIAL GRANT SET EVALUATION FROM PARTIAL EVIDENCE IN AN EVIDENCE-BASED SECURITY POLICY MANAGER

CROSS-REFERENCE TO RELATED APPLICATIONS

The present application is a continuation of and claims priority from U.S. patent application Ser. No. 10/162,260, entitled PARTIAL GRANT SET EVALUATION FROM PARTIAL EVIDENCE IN AN EVIDENCE-BASED SECURITY POLICY MANAGER, filed Jun. 5, 2002, which is a continuation-in-part of and claims priority from U.S. Pat. No. 7,051,355 issued May 23, 2006, entitled EVIDENCE-BASED SECURITY POLICY MANAGER, filed on Jun. 21, 2000, and assigned to the Assignee of the present invention. The present application is also related by subject matter to U.S. patent application Ser. No. 09/599,015, entitled FILTERING A PERMISSION SET USING PERMISSION REQUESTS ASSOCIATED WITH A CODE ASSEMBLY, and U.S. patent application Ser. No. 09/598,814, entitled EVALUATING INITIALLY UNTRUSTED EVIDENCE IN AN EVIDENCE-BASED SECURITY POLICY MANAGER, each filed Jun. 21, 2000 and assigned to the Assignee of the present invention.

TECHNICAL FIELD

The invention relates generally to computer security, and more particularly to an evidence-based security policy manager that determines a subset of allowed permissions based on a subset of a complete evidence set.

BACKGROUND OF THE INVENTION

Security risks, such as allowing unauthorized access to a user's system, are inherent with many on-line activities. Therefore, security mechanisms have been developed to protect users' systems. For example, a user may download an on-demand application from the Internet and execute the application from within the browser. To prevent an unauthorized access to the user's system resources (e.g., a directory on the user's hard disk), the user's system is protected by "sandbox" security that is enforced within the browser environment. Sandbox security involves a limited, secure area of computer memory in which an application may execute, so that the application is prevented from accessing system resources that reside outside of the secure area.

In some circumstances, however, a user may wish to allow a downloaded application controlled access to certain resources within the user's system. For example, a user may wish to use an on-demand word processing application to generate a document and then save the document to a directory in the user's system.

Existing approaches for providing such applications with secure, controlled access to a user's system are too cumbersome and inflexible. In one method, for example, a security policy is defined within a policy database in which a given application is associated with a permission set. The security policy, in combination with origin information, signature information, and access restrictions, helps define a "trusted" relationship between the application and the user's system.

Consider the following example:

```
grant CodeBase "http://www.BobsWidgets.com" signed by
BobsCertificate {
    permission lang.io.FilePermission "/tmp/" "read";
    permission lang.io.FilePermission "/tmp/bwdir/*" "write";
}
```

In the example, an applet from the source location, "www.BobsWidgets.com", is granted certain file access permissions if it is signed with a private key corresponding with a public key contained within BobsCertificate. An applet is traditionally a program designed to be executed from within a browser, rather than directly from within the operating system. The applet is granted permission to read files from the "/tmp" directory on the host system and to create and write to files in the "/tmp/bwdir" directory. Permission to "execute" is another common permission modifier. Other security policy specifications may, for example, grant broad permissions to access any file in any system location, regardless of the application's source or whether the application is unsigned or signed.

In such approaches, security policies are particularly static, remaining fixed over long periods of time. As on-demand application processing via the Internet becomes more prevalent, substantially static security policies are too limiting. Furthermore, the infrequent security policy changes that do occur (usually performed by a system administrator) can introduce security weaknesses or gaps, or prevent authorized applications from running by denying access to an application that had previously been granted access. As such, existing security architectures fail to dynamically and flexibly determine whether an application (or a given code assembly of an application) may be trusted with some amount of access to the user's system.

SUMMARY OF THE INVENTION

In accordance with the present invention, the above and other problems are solved by an evidence-based policy manager that generates a permission grant set for a code assembly received from a resource location. Evidence associated with the code assembly is evaluated relative to a collection of code groups, which is defined in a security policy specification. Based on the evidence, the policy manager determines the membership of the code assembly in one or more code groups of the code group collection. Each code group is associated with a code-group permission set. The code-group permission sets for those code groups in which the code assembly is deemed a member are used to generate a permission grant set for the code assembly. The permission grant set is thereafter used in the run-time call stack to determine whether a given system operation by the code assembly is authorized by the security policy (i.e., whether the permission grant set satisfies the permission requirements associated with the system operation). For example, to write to a protected directory, a code assembly must be associated with a permission grant set permitting a write operation to the protected directory.

In one aspect of the invention, a policy manager module determines a subset of a permission grant set based on a subset of the evidence received with a code assembly. The policy manager may, prior to receiving requests for evaluating evidence, evaluate an evidence subset using the security policy, for all possible values of the subset, to determine the resultant permissions granted, and storing the results. Upon receiving subsequent requests for whether a desired permission is granted, the policy manager may query the stored results instead of reevaluating the received evidence against the security policy.

In another aspect of the invention, there is a system that can determine a subset of a permission grant set based on an evidence subset. The system may include a policy manager that uses an evidence based security model that evaluates multiple pieces of evidence using a security policy to determine a set of granted permissions. The system may include an oracle for determining whether a desired permission is granted based on a subset of the multiple pieces of evidence. The policy manager, upon receiving a request for the first permission, may query the oracle to determine whether the desired permission is granted, instead of evaluating the evidence using the security policy. Some aspects of the invention embody the method in computer readable instructions stored on a computer readable medium.

In another aspect of the invention, the above-referenced oracle may be stored in a data structure for indicating whether a desired permission is granted based on an evidence subset. The data structure may include a first portion corresponding to a first value of a first piece of evidence and a plurality of permissions, and a second portion corresponding to a second value of the first piece of evidence and the plurality of permissions. The data structure stores data indicative of whether, for each value/permission pair, the permission is granted or whether the permission is either not granted or unknown.

DETAILED DESCRIPTION OF THE INVENTION

An embodiment of the present invention provides an evidence-based policy manager that generates a permission grant set for a code assembly received from a resource location. Generally, a code assembly is a unit of packaged code, such as a .EXE file, a .DLL file, or a PE ("Portable Executable") file. More details of regarding the PE file format are discussed in an article from the Microsoft Developers Network at http://msdn.microsoft.com/library/techart/msdn_peeringpe.htm, March 1994. The policy manager can execute in a computer system (e.g., a Web client or a networked workstation) in combination with the verification module and class loader of the run-time environment; however, a policy manager can execute outside of a run-time environment. The permission grant set generated for a code assembly is applied in the run-time call stack to help the system determine whether a given system operation by the code assembly is authorized. The policy manager may process permission requests received in association with the code assembly. Furthermore, both code assemblies and evidence may be received via a distribution mechanism, including a local source (e.g., from within the local machine), a local network or peripheral, or a remote resource location via a network (e.g., the Internet).

The policy manager may comprise execution modules for parsing a security policy, generating one or more code group collections, evaluating membership of the received code assembly in one or more code groups, and generating a permission grant set. The policy manager may generate multiple policy-levels in accordance with a security policy definition specified in a security policy specification. Multiple policy levels may consist of multiple security policy descriptions that apply in combination to a particular code assembly for purposes of determining what permissions can be granted to the code assembly. For example, one policy level may apply to all code that runs on the machine, and another might vary depending on the user currently logged in to the machine with respect to a particular execution of an assembly. Permission sets from each policy level may be merged to generate a permission grant set associated with the code assembly and applied in the run-time call stack of the execution thread.

Figure 1:
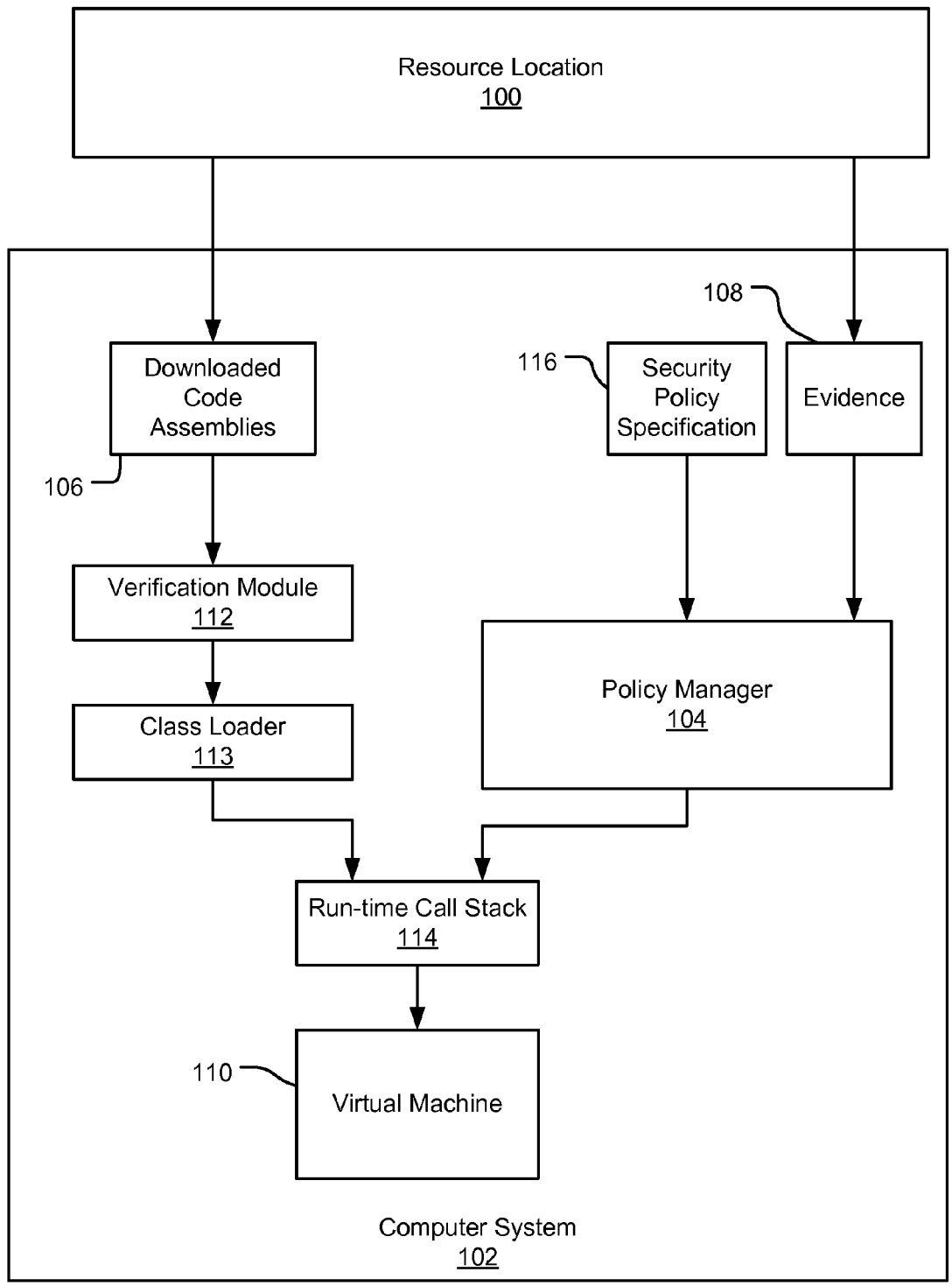
FIG. 1 depicts an evidence-based security policy manager in an embodiment of the present invention.

FIG. 1 depicts an evidence-based security policy manager 104 in an embodiment of the present invention. A resource location 100, such as a Web server, is accessible by a computer system 102 (e.g., a Web client or server) across a network (not shown). A resource location is commonly indicated by a URI (Uniform Resource Identifier), which is a generic term for all types of names and addresses that refer to objects on the World Wide Web. A URL (Uniform Resource Locator) is a kind of URI. Exemplary resources may include without limitation documents, images, audio data, applications, routines, and other data and code datastores accessible through a network. It should be understood that a resource location may be local to the computer system 102 or remote to the computer system 100 (e.g., coupled by the Internet).

One type of resource relevant to an embodiment of the present invention is a code assembly. A code assembly may, for example, consist of applet code, application code, class code, routine code, and data. Code and data included in a code assembly may be in the form of byte-codes, intermediate code, machine code, and data components (classes, images, audio and video clips, etc.). Furthermore, a code assembly may be packaged in an archive file containing one or more classes downloaded from a resource location. In one embodiment of the present invention, classes of an application are combined into a module (an output of a linking process), and one or more modules may be combined into a code assembly.

FIG. 1 is described relative to a downloaded application executing on a computer system 102. Alternative embodiments may include downloaded applets, ACTIVEX controls, and other routines and objects. The exemplary downloaded application consists of objects defined in one or more local or remote code assemblies. Local code assemblies are stored within the computer system 102 and are loaded into memory when needed. Remote code assemblies are downloaded from a resource location, such as resource location 100.

The computer system 102 initiates a run-time environment to execute the downloaded application and to manage security of the computer system 102. The run-time environment on the computer system 102 may be initialized by a "trusted host", such as an operating system shell, a browser, an SQL server, or other code that is external to the run-time environment. The host, the loader 113, or some other shared resource initiates execution of the application by downloading the various code assemblies 106 that constitute the application to the computer system 102 and passing the code assemblies 106 to a virtual machine 110 for execution.

A virtual machine provides a self-contained operating environment that performs much of the functionality of a separate computer. For example, an application can run in a virtual machine without direct access to the host operating system. This design has at least two advantages:

1) System Independence: An application will run the same in any virtual machine that supports the programming language in which the application is written, regardless of the hardware and software underlying the system. For example, the same application (i.e., the same programming code) can run in a virtual machine on different computer systems having different types of microprocessors and different types of operating systems.

2) Security: Applications running in a virtual machine are generally prevented from accessing protected system resources (i.e., the operating system, the file system, protected regions of memory, a connected network or peripheral). It should be understood, however, that an embodiment of the present invention can evaluate evidence and a security policy to determine whether to permit an application to access protected system resources. If permission for a given operation is granted, the application is considered "trusted" for that operation.

As the application components (e.g., downloaded code assemblies 106) are received by the computer system 102, a verification module 112 ensures that downloaded code in the code assemblies 106 is properly formatted and does not violate the safety restrictions of the code language or the virtual machine 110. Specifically, the safety restrictions that are to be enforced prevent potentially malicious code from accessing data other than through the well-defined interfaces of the code. It is important that verified code be unable to examine or modify the granted permission sets that are associated with the code assembly through mechanisms that are inaccessible to the code assembly (i.e., accessible only to the execution environment). Other verifications, such as verifying that pointer addressing is not present, that internal stacks cannot overflow or underflow, and that code instructions will have the correct typed parameters, may also be performed. The code assemblies are then passed to a class loader 113, which can ensure that the application does not replace system-level components within the run-time environment (e.g., the class loader can force host-provided code assemblies to be executed when requested, thereby superceding name conflicts with downloaded code assemblies). Thereafter, the class loader 113 loads the code assemblies 106 onto a run-time call stack 114 in response to requests from the virtual machine 110.

Figure 2:
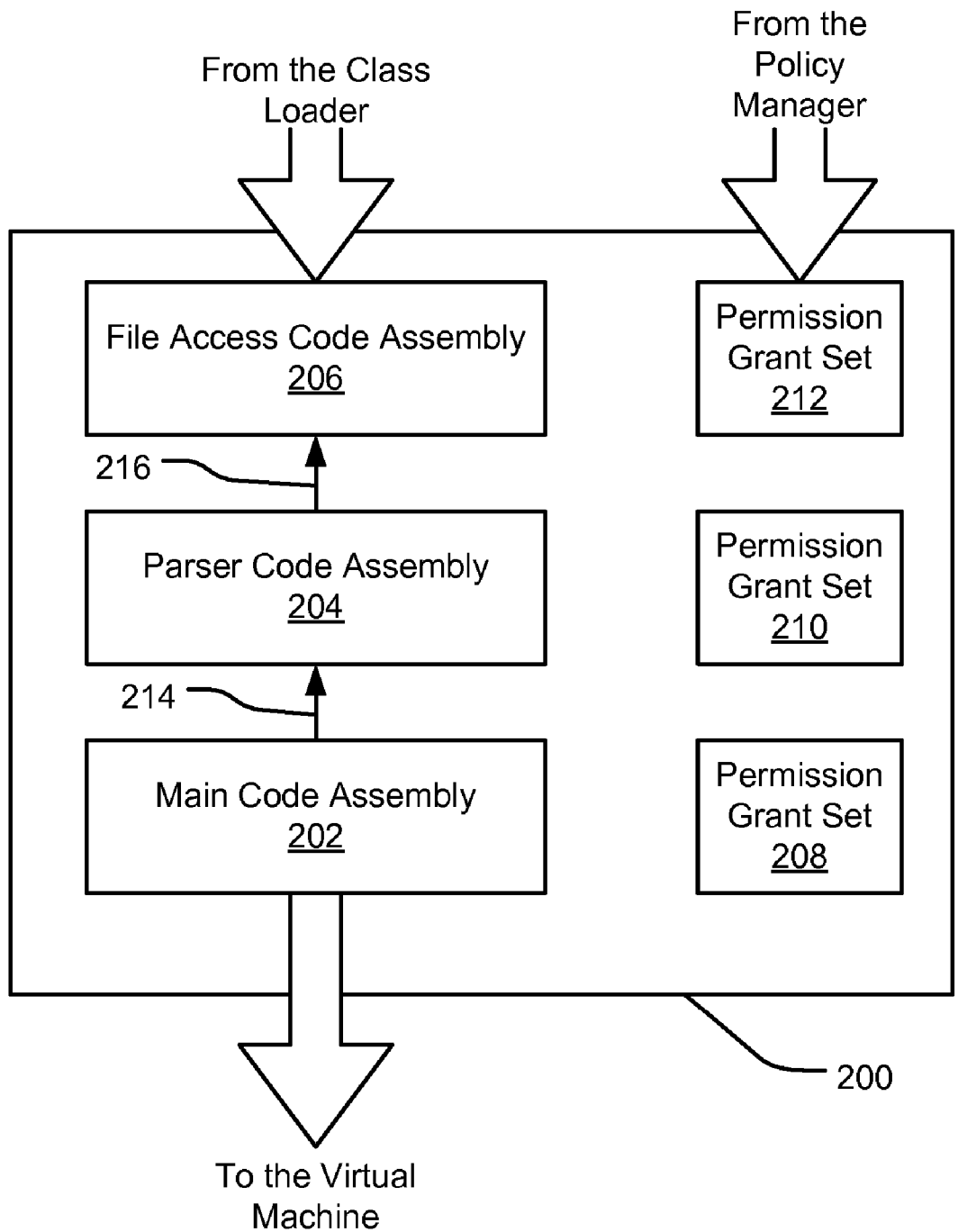
FIG. 2 represents a run-time call stack in an embodiment of the present invention.

For example, the virtual machine executes a first code assembly (e.g., main code assembly 202 of FIG. 2) that calls a routine provided by a second code assembly (e.g., parser code assembly of FIG. 2). The class loader 113 receives the virtual machine's request for the second code assembly and loads the second code assembly into the run-time call stack 114 so that the first code assembly can call the needed routine.

In order to ensure that unauthorized accesses to protected areas are prevented, evidence 108 associated with each of the downloaded code assemblies 106 is input to the policy manager 104. The policy manager 104 determines the permission grant set associated with each code assembly. A security policy specification 116 is also input to the policy manager 104 to assist in the computation of appropriate grants. Based on these inputs, the policy manager 104 computes the appropriate grants for each code assembly and passes a resulting permission grant set to the run-time call stack 114.

As such, each code assembly in the run-time call stack 114 is associated with a corresponding permission grant set (e.g., permission grant sets 208, 210, and 212 in FIG. 2). A grant set is received from the policy manager and defines various permissions that have been computed for a corresponding code assembly. The permissions associated with each code assembly may vary widely based on the relative origin of the code assembly (e.g., local or remote), the specific origin of the code assembly (e.g., a specific URL), or other trust characteristics of the code assembly, all of which may be referred to as "evidence" 108. Exemplary trust characteristics may include cryptographic strong names, AUTHENTICODE signatures, and other security related evidence. In an embodiment of the present invention, evidence is used to determine a permission grant set for a given code assembly. Furthermore, a security policy specification 116 may define multiple policy levels within a security framework for a given enterprise, machine, user, application, etc. in which the evidence of a given code assembly is evaluated.

FIG. 2 represents a run-time call stack 200 containing individual code assemblies that are stacked in the order in which they were called. The individual code assemblies may be downloaded from a remote resource location or may be retrieved locally from the computer system 102 of FIG. 1. The individual code assemblies are loaded into the run-time call stack 114 by the class loader 113 for access and execution by the virtual machine 110 in FIG. 1.

An alternative run-time call stack includes a slot for every method in a call chain. A grant set can be associated with a code assembly, a module of a code assembly, a class of a code assembly, or a method of a call assembly in the call chain. Evidence may also be associated with a code assembly, a module of a code assembly, a class of a code assembly, or a method of a call assembly.

In one embodiment, methods from a single assembly are associated with the same permission grant set. As such, the permission grant set need only be checked when the call chain transitions to a method in another code assembly (i.e., calls made within the same code assembly may not require a permission grant set check). Alternatively, classes, modules, or methods may be associated with distinct permission grant sets within the scope of the present invention.

For example, an object of the main application class in code assembly 202 is loaded first by the class loader into the illustrated run-time call stack 200. As the virtual machine executes the main class, the main class creates a parser object from a code assembly 204 and calls a method in the parser object to parse a data file in a protected area of the computer system. Accordingly, the class loader loads the parser code of the code assembly 204 into the run-time call stack 200. Thereafter, the parser object creates a file access object from a code assembly 206 and calls a method in the file access object to perform a read operation on the protected file. Accordingly, the class loader loads the file access code of the code assembly 206 into the run-time call stack 200.

Each permission grant set corresponds to a code assembly in the run-time call stack. As such, a code assembly's attempt to access a protected resource is evaluated against its associated permission grant set, as well as the permission grant sets of other code assemblies in the run-time call stack 200. In the example of the read operation to the protected file by the application illustrated in FIG. 2, the main code assembly 202 is associated with a permission grant set 208. The main code assembly 202 calls (as represented by arrow 214) a method in the parser code assembly 204, which is associated with the permission grant set 210. In order to access the protected file, the parser code assembly 204 calls (as represented by arrow 216) a method in the file access code assembly 206, which is associated with the permission grant set 212. In order to determine whether the file access code assembly 206 can access the protected file, the "intersection" of the permission grant sets 208 and 210 is calculated and used to determine whether the file access operation is permitted. For example, if the permission grant set 210 includes a permission to read from the protected file, but the permission grant set 208 does not, then access to the protected file is denied. In alternative embodiments, other logical operations may be employed to determine whether the file access operation is permitted.

Generally, an "intersection" operation (represented by the symbol "∩") is a set operation that yields the common elements of the operand sets. For example, if Set1 includes elements A, B, and C, and Set2 includes elements B, C, and D, then the intersection of Set1 and Set2 (i.e., Set1∩Set2) equals B and C. In contrast, a "union" operation (represented by the symbol "∪") is a set operation that yields all elements in the operand sets (i.e., the non-duplicative aggregation of all the elements in the sets). For example, if Set1 includes elements A, B, and C, and Set2 includes elements B, C, and D, then the union of Set1 and Set2 (i.e., Set1∪Set2) equals A, B, C and D.

Figure 3:
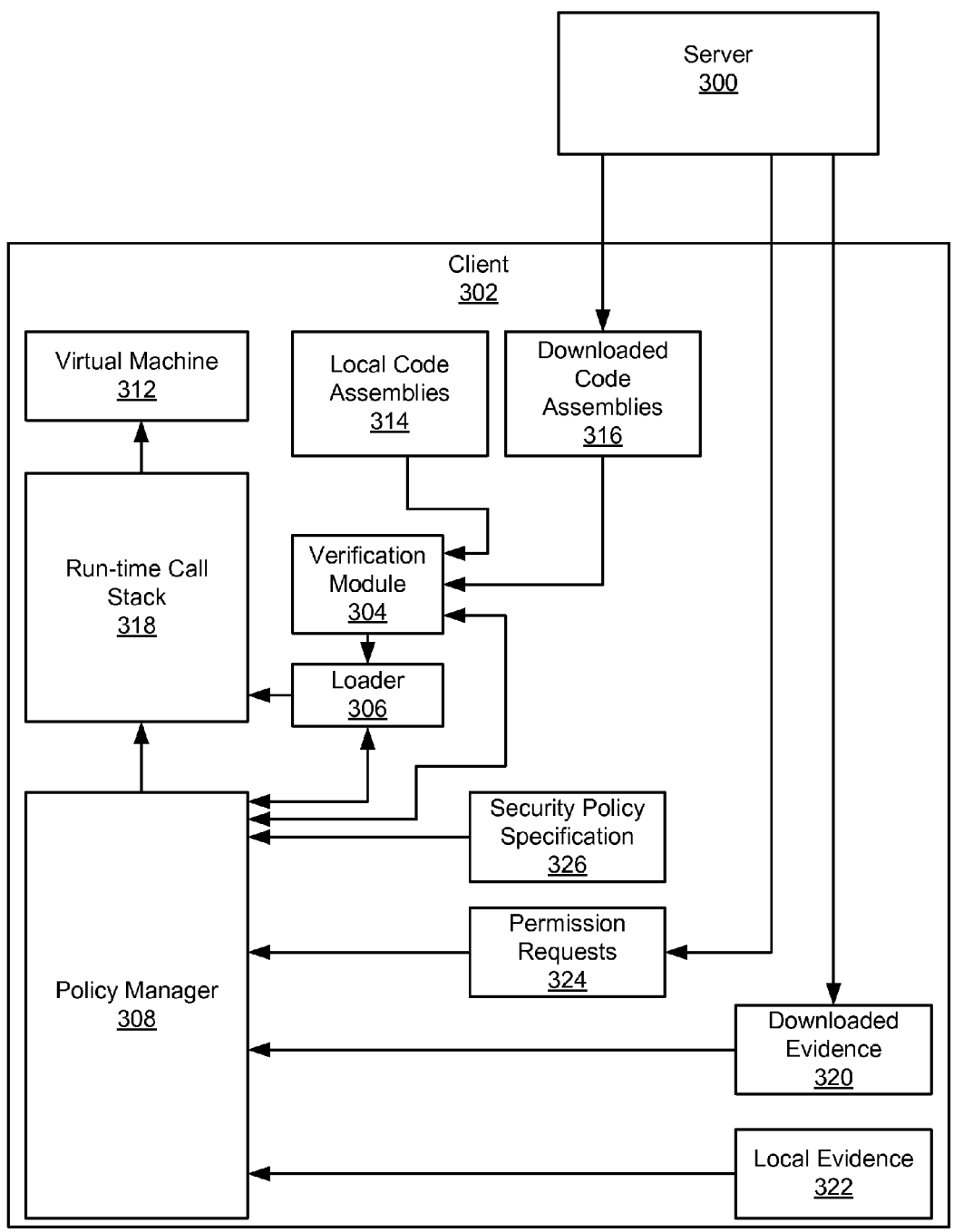
FIG. 3 depicts a computer system for managing evidence-based security in an embodiment of the present invention.

FIG. 3 depicts a computer system for managing evidence-based security in an embodiment of the present invention. A server 300 is coupled to a client 302 via a communications network (not shown). The client 302 executes a run-time environment (e.g., the COM+ 2.0 Run-time environment from Microsoft Corporation) to manage execution of applications on the client 302. In an embodiment of the present invention, the run-time environment includes verification module 304, a loader module 306, and a policy manager 308.

As previously discussed, code assemblies are loaded into a run-time call stack 318 for execution by a virtual machine 312. A first category of code assembly is represented by local code assemblies 314, which are generally considered trusted code assemblies because they originate on the client 302. In contrast, a second category of code assembly is represented by downloaded code assemblies 316, which may originate from a remote or untrusted resource location, such as the server 300. Although local code assemblies 314 are generally trusted and downloaded code assemblies 316 are implicitly un-trusted, this convention may be controlled by the security policy specification 326 and may be modified to meet the administrators needs. In an embodiment of the present invention, local code assemblies 314 and downloaded code assemblies 316 are input to the verification module 304 for verification. Thereafter, the code assemblies are input to the loader module 306 to be loaded into the run-time call stack 318.

The code assemblies 314 and 316 are generally associated with evidence (or credentials) used to compute a permission grant set for each code assembly. One exemplary evidence component may be an AUTHENTICODE signature. Another exemplary evidence component is a PICS (Platform for Internet Content Selection) label, which states properties of an Internet resource (e.g., executable code has been virus checked). More details regarding a PICS label are discussed in P. Resnick and J. Miller, "PICS: Internet Access Controls without Censorship," Communications of the ACM, 39 (1996), pp. 87-93; also available at www.w3.org/pub/WWW/PICS/iacwcv2.htm. Other examples of evidence may include, without limitation, proofs of purchase or license, author identifiers, vendor identifiers, versioning information, and programmatic credentials. Programmatic credentials, for example, may be in the form of program code that examines statements made by other credentials and fetches supplementary information from the network before deciding which evidentiary statements to provide to the policy manager 308.

Evidence about a code assembly may be provided by the host or extracted from the code assembly itself. Local or host-provided evidence 322 is implicitly trusted and believed to be true. However, downloaded or assembly provided evidence 320 is not implicitly trusted and must either be self-verifying (e.g., digitally-signed) or independently verified. Downloaded evidence 320 may be downloaded from one or more resource locations and is not limited to evidence downloaded from the resource location from which the code assembly originates.

Local evidence 322 and downloaded evidence 320 are input to the policy manager 308, which evaluates the evidence based on the security policy. Within the policy manager 308, the evidence is evaluated in combination with the security policy specification 326 (and optionally permission requests 324, which define a permission set requested by the code assembly) to generate a final permission grant set that corresponds with a given code assembly.

Furthermore, because the verification process at the verification module 304 and the security management process at the policy manager 308 can execute concurrently, the two processes can communicate to affect each other. For example, the policy manager 308 may evaluate evidence indicating that a given code assembly is guaranteed to be type safe. Accordingly, this type safety guarantee can be communicated to the verification module 304, which may skip a type checking operation based on the information. Alternatively, the verification module 304 may determine that a given code assembly does not pass a type safety check. In response, the verification module 304 may communicate with the policy manager 308 to query whether the code assembly has been granted permission to execute despite the failure to pass a type safety check.

Figure 4A:
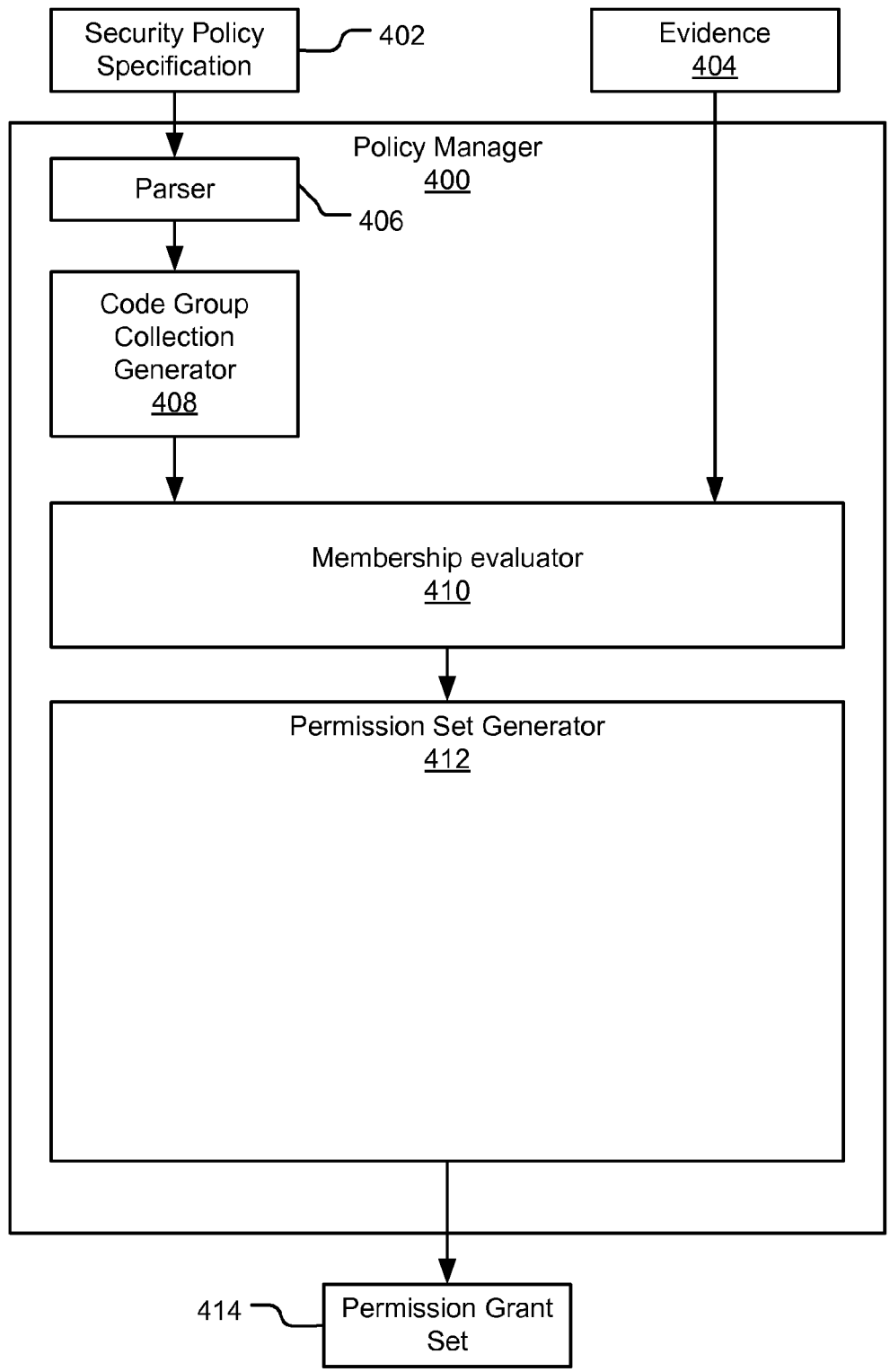
FIG. 4A depicts a policy manager for managing evidence-based security in an embodiment of the present invention.

FIG. 4A depicts a policy manager for managing evidence-based security in an embodiment of the present invention. Executable components described relative to FIG. 4A may be implemented as software modules that are executable on a computer system. Alternatively, executable components implemented in hardware or in a combination of hardware and software are also contemplated in the scope of the present invention.

Figure 6:
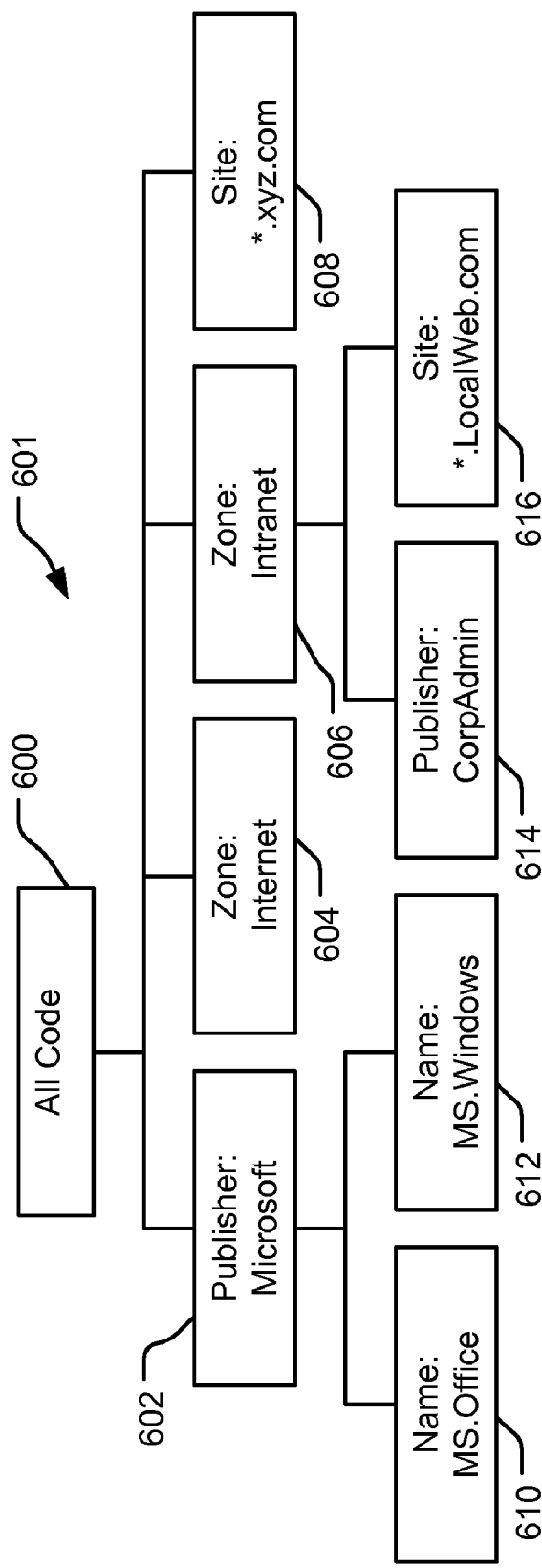
FIG. 6 illustrates an exemplary code group hierarchy in an embodiment of the present invention.

A policy manager 400 is coupled to receive a security policy specification 402 and an evidence set 404. The security policy specification 402 specifies a definition of one or more code groups, which may be used to define a category of code assembly (e.g., a code assembly signed by a given publisher). In one embodiment, the code groups are configured into one or more code group collections. Alternatively, code groups may be configured into one or more code group hierarchies. An exemplary code group hierarchy is illustrated in FIG. 6. The security policy specification may also define one or more policy levels. The evidence set 404 defines trust characteristics associated with a code assembly received by a computer system.

In an embodiment of the present invention, a parser 406 receives the security policy specification 402 and extracts a definition of one or more code groups. Each code group is associated with a membership criterion, a child definition (specifying zero or more child code groups of the code group), and a code-group permission set. The membership criterion specifies the conditions of membership for a given code group, which an evidence set must satisfy in order for a corresponding code assembly to be deemed a member of the code group. The child code group definition specifies the children of a given code group. If a code assembly proves membership in a first code group (i.e., a parent code group), the code assembly will be considered for membership in the child code groups of the parent code group. Code-group permission sets represent collections of permissions that may be assigned to code groups. If a code assembly is determined to be a member of the code group, the permissions of the associated permission set may be granted to the code assembly, subject to other operations within the policy manager.

Other code group embodiments may include alternative data configurations. For example, in one embodiment, a code group collection is represented in a one-dimensional list of code groups, wherein each code group includes a membership criterion and a permission set, and omits a child code group definition of the previous discussion. In this embodiment, the one-dimensional list may be ordered or unordered. Furthermore, other data configurations are contemplated within the scope of the present invention.

In an exemplary embodiment of the present invention, permission sets may be named to allow identification in the security policy specification 402. More than one code group may be assigned the same named permission set. As such, if a change is made to a named permission set (e.g., insertion or deletion of an individual permission), the change affects all of the code groups associated with that named permission set. For example, to grant the same permissions to several extranet business partner web sites that are members of different code groups, a single named permission set can be defined and assigned to the several code groups.

In an embodiment of the present invention, three types of named permission sets are supported: (1) standard permission sets—these sets are predefined and cannot be changed; (2) predefined permission sets—these sets may be modified by the administrator; and (3) custom permission sets—these sets may be defined by a user so long as the permission set names do not conflict with standard or predefined permission set names. In one embodiment, standard permission sets are available at all policy levels and may not be redefined in any individual policy level (universal scope). In this embodiment, the predefined and custom permission sets are defined and referenced within any given policy level and cannot be referenced from other policy levels (policy-level scope). It should be understood, however, that the scope of any permission set may extend beyond a given policy level in an alternative embodiment of the present invention.

Table 1 describes standard permission sets available in an embodiment of the present invention. Some standard permission sets, such as Internet and LocalIntranet sets, are predefined but may be modified by a user or an administrator. Other permission sets, such as SkipVerification, cannot be modified in an embodiment of the present invention. Alternative named permission sets are also contemplated within the scope of the present invention, and the named permission sets described in Table 1 may be modified without departing from the present invention.

TABLE 1

Standard Permission Sets

| Standard Permission Sets | Description |
| --- | --- |
| Nothing | The associated code assembly has no permissions (i.e., to execute, to read, to write, to create, to append, to customize, to assert, to use, etc.). |
| Execution | The associated code assembly has permission to execute, but no other permissions to use protected resources. |
| Internet | The associated code assembly has the default permissions suitable for content from unknown origin, including permissions to execute, to open safe windows on the user interface to access the clipboard, to create its own application domain, to store a limited amount of data in a secure area, etc. |
| LocalIntranet | The associated code assembly has the default permissions suitable for content originating from within an enterprise, including permissions to access environment variables containing the user's current username and temporary directory locations, to execute and assert, to broadly access the user interface, to store a limited amount of data in a secure area, etc. |
| Everything | The associate code assembly has permissions from all standard name permission sets. |
| Skip Verification | The verification process or a portion thereof may be skipped, or the code assembly has permission to fail verification or a portion thereof. |

The code-group permission set associated with a given code group may specify permissions associated with the code group. Alternatively, the code-group permission set associated with a given code group may specify permissions associated with the code group and all ancestor code groups. This flexibility allows a variety of security configurations (e.g., policy levels, permission sets, membership criteria, etc.) to be defined in a security policy specification. As discussed below, the policy manager may be developed to accommodate such a variety of security configurations.

In one embodiment, the security policy specification 402 may also specify multiple policy levels, each policy level having one or more code groups. The code groups may be configured into one or more code group collections or hierarchies. Policy levels allow an administrator, for example, to define different security policies for different machines, users, applications, time periods, user groups etc. When a membership evaluator 410 generates a policy-level permission set for a given policy level, the membership evaluator 410 traverses through the code groups associated with that policy level. The policy manager 400, therefore, can generate a permission set associated with the individual policy level. Thereafter, the permission sets from multiple policy levels may be processed (e.g., merged or selected) to generate a resulting permission grant set 414.

Alternatively, the security policy specification 402 may specify one or more code group collections, and allocate the multiple policy levels across those code group collections. One method in which the allocation may be accomplished includes adding policy level properties to each code group. In this method, when the membership evaluator 410 traverses through the code group collections to determine the policy-level permission set for a given policy level, a code assembly is only determined to be a member of code groups associated with the policy level. To process multiple policy levels in this embodiment, the one or more code groups (or code group hierarchies) are traversed once for each policy level. Alternative methods for managing code groups, code group collections, and policy levels are contemplated with the scope of the present invention.

In the illustrated embodiment, a code group collection generator 408 receives the parsed definition from the parser 406 and generates one or more code group collection in the memory of the computer system. The membership evaluator 410 receives the evidence set 404 and extracts trust characteristics relating to the corresponding code assembly. The membership evaluator 410 traverses through a code group collection (see FIG. 6 for an illustration of an exemplary code group hierarchy) to determine whether the code assembly is a member of one or more of the code groups within the code group collection. A permission set generator 412 receives the membership determination from the membership evaluator 410 and generates the appropriate permission grant set 414.

In an alternate embodiment of the present invention, if the membership evaluator 410 and permission set generator 414 guarantee that they will always compute the same permission grant set 414 from the same input evidence set 404, then the output permission grant set 414 may be cached for improved performance after it is initially computed. In this embodiment (not shown), the policy manager 400 caches mappings from input evidence sets to output permission sets. When an evidence set is input to the policy manager for resolution, the policy manager first checks to see whether a mapping exists for the input evidence set. If so, then the policy manager returns the permission set stored in the mapping directly, bypassing the membership generator 410 and permission set generator 412 (because the input evidence set will ultimately yield a permission set equal to the cached result). In this embodiment, the policy manager invalidates all cached evidence/permission set mappings whenever the security policy specification 402 is changed, because a set of mappings is valid only for a particular security policy. In alternative embodiments, other caching policies are contemplated, such as invalidating mappings after a given period of time or in response to a predetermined trigger event.

Multiple embodiments of the present invention may be employed to generate an appropriate permission grant set, depending on the configuration of the security policy specification 402. In an embodiment illustrated in FIG. 4B, the security policy specification may define a single policy level. As such, it is only necessary to generate or select an appropriate permission set for the single policy level. No supplemental processing is required to merge or select from permission sets associated with multiple policy levels.

Figure 4B:
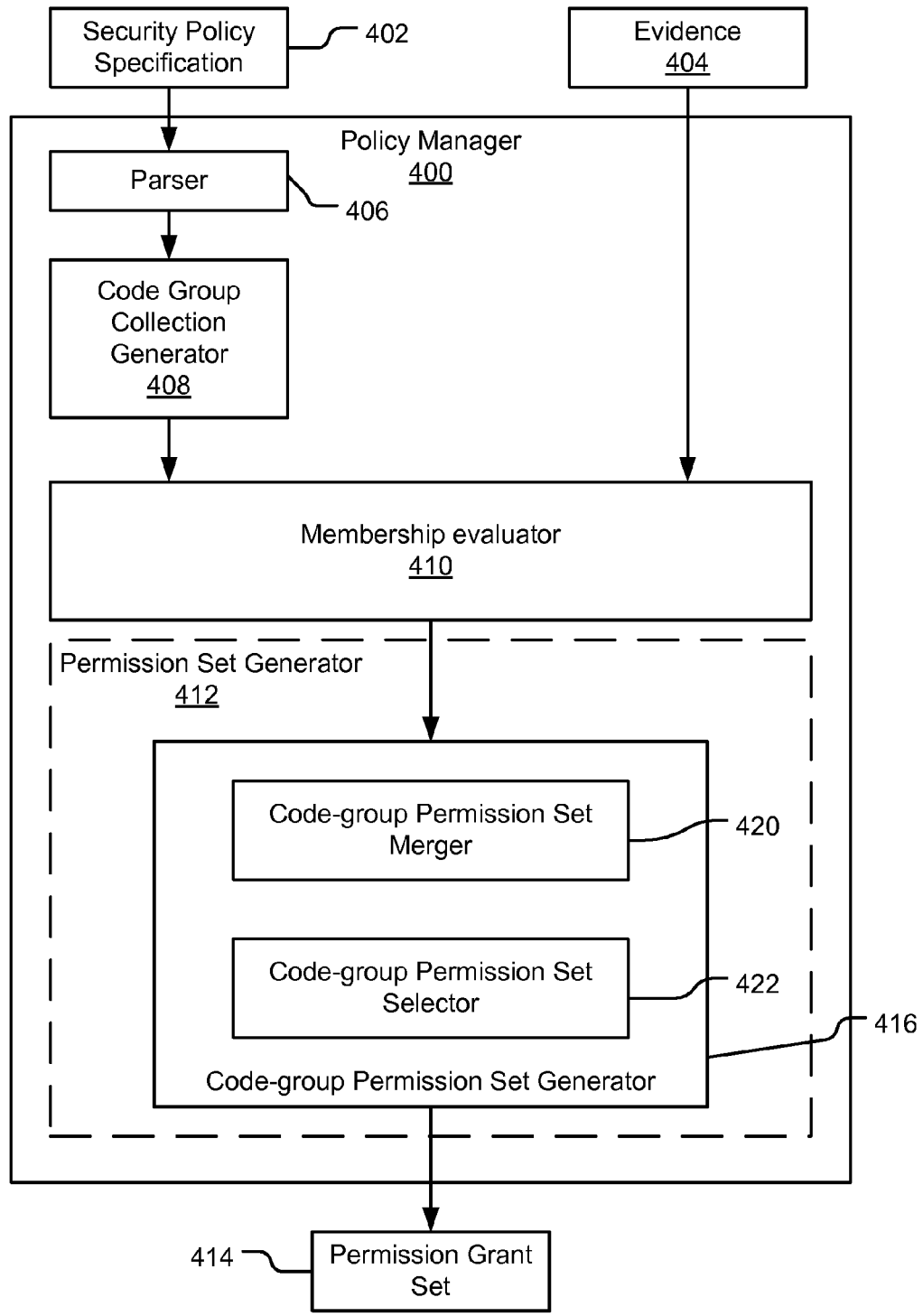
FIG. 4B depicts a policy manager for managing evidence-based security with a code-group permission set generator in an embodiment of the present invention.

Accordingly, as illustrated in FIG. 4B, the membership determination is received by a code-group permission set generator 416, which generates the permission grant set 414. In one method of generation, the code-group permission set generator 416 executes a code-group permission set merger 420 to compute the union of code-group permission sets associated with the code groups in which the code assembly is deemed to be a member. If multiple policy levels are specified, the merger may be executed on a per-policy-level basis.

Alternative forms of merger are also contemplated within the present invention, including without limitation computing an intersection of the code-group permission sets or choosing an individual code-group permission set from the member code groups based on another algorithm (e.g., a weighted or unweighted selection process, the first to be identified in an ordered list, etc.) to determine the output of the code-group permission set generator 416. One exemplary merger operation is referred to a "choose first from list" operation. In one embodiment, the children of a given code group are associated with an order or priority value. Accordingly, the code-group permission set returned from a given code group may include only the permission set of the highest order child code group of which the code assembly is a member. Alternatively, another ordering algorithm may be employed.

In an alternate embodiment, the code-group permission set generator 416 executes a code-group permission set selector 422 to select an appropriate code-group permission set and to provide the selected code group permission set as the permission grant set 414. An example of the utility of the code-group permission set selector 422 may be illustrated for a code group hierarchy in which each child code group is associated with a permission set reflecting permissions of the child code group and the child code group's ancestors. In this manner, a merger operation may not be required because the merger is inherently represented by the permission set associated with the child code group. In yet another embodiment, the code-group permission set selector 422 may be used to select a permission set of an "exclusive" code group in which the code assembly is a member (see the Exclusive property flag description relating to FIG. 5).

In at least these configurations, the code-group permission set generator 416 may generate a permission grant set 414 based on code-group permission sets. It should be understood that the code-group permission set generator 416 may include a code-group permission set merger 420, a code-group permission set selector 422, an alternative generator component, or a combination of these components.

Figure 4C:
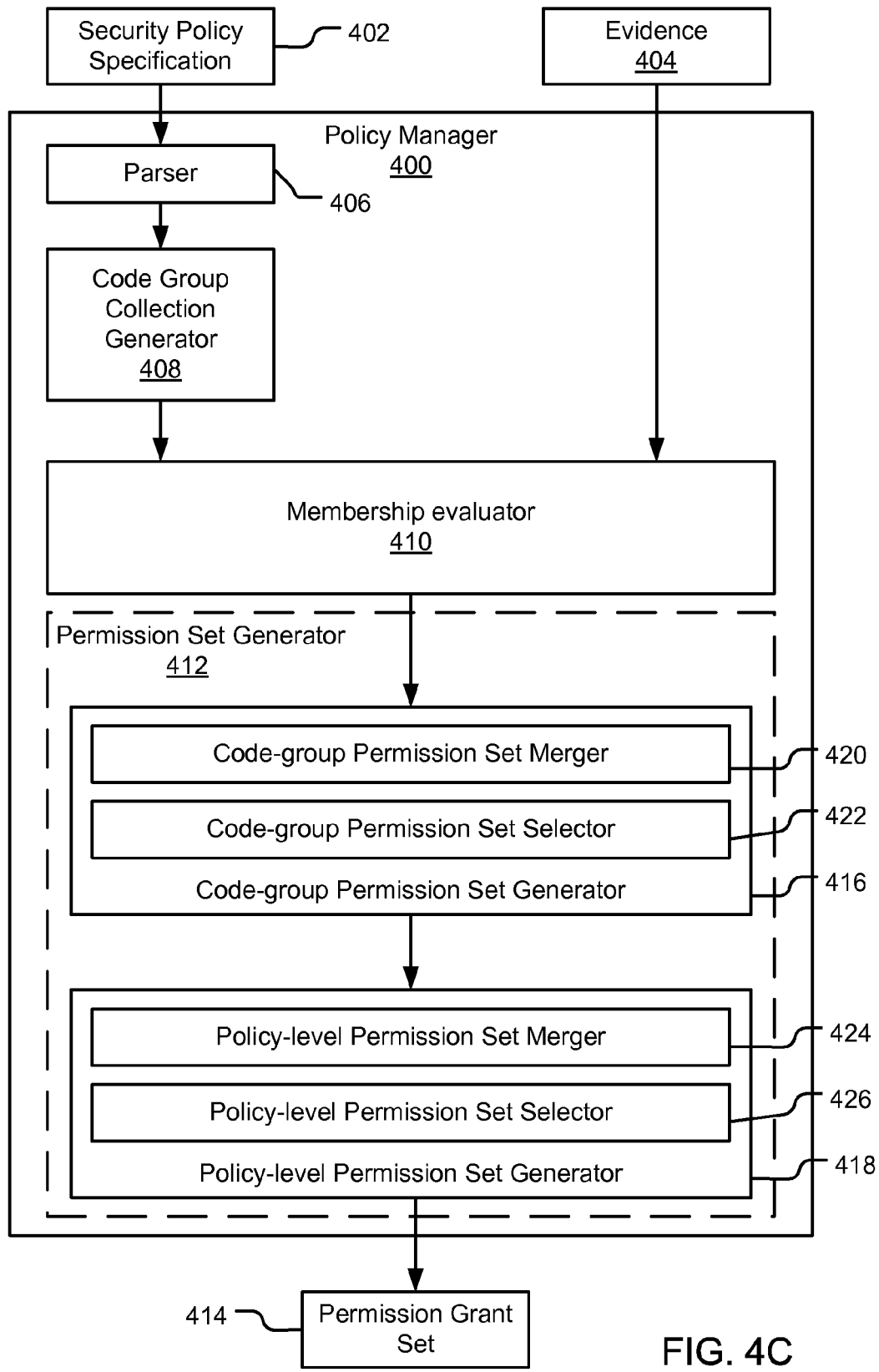
FIG. 4C depicts a policy manager for managing evidence-based security capable of supporting multiple policy levels in an embodiment of the present invention.

In another embodiment illustrated in FIG. 4C, the security policy specification may define multiple policy levels. If multiple policy levels are specified, the membership evaluator 410 may traverse through some or all of the policy levels to identify code group membership for each policy level. The code group membership determinations for each policy level are then passed to the code-group permission set generator 416 to generate a policy-level permission set for each policy level. In this embodiment, the policy-level permission set generator 418 receives policy-level permission sets and generates the permission grant set 414 therefrom. The policy-level permission sets are generated based upon the code-group permission sets associated with a code group or groups in which the code assembly has been deemed a member.

In the illustrated embodiment in FIG. 4C, the policy-level permission set generator 418 executes either a policy-level permission set selector 426 to select an appropriate policy-level permission set or a policy-level permission set merger 424 to compute the intersection of the policy-level permission sets. Accordingly, the policy-level permission set generator 418 provides the selected permission set or the merged permission set as the permission grant sets 414. Alternative forms of merger are also contemplated within the present invention, including without limitation performing an alternative set operation on the policy-level permission sets or choosing an individual policy-level permission set received from the policy levels based on another predetermined algorithm (e.g., a weighted or non-weighted selection process, the first to be identified in an ordered list, etc.) to determine the output of the policy-level permission set generator 418.

Figure 5:
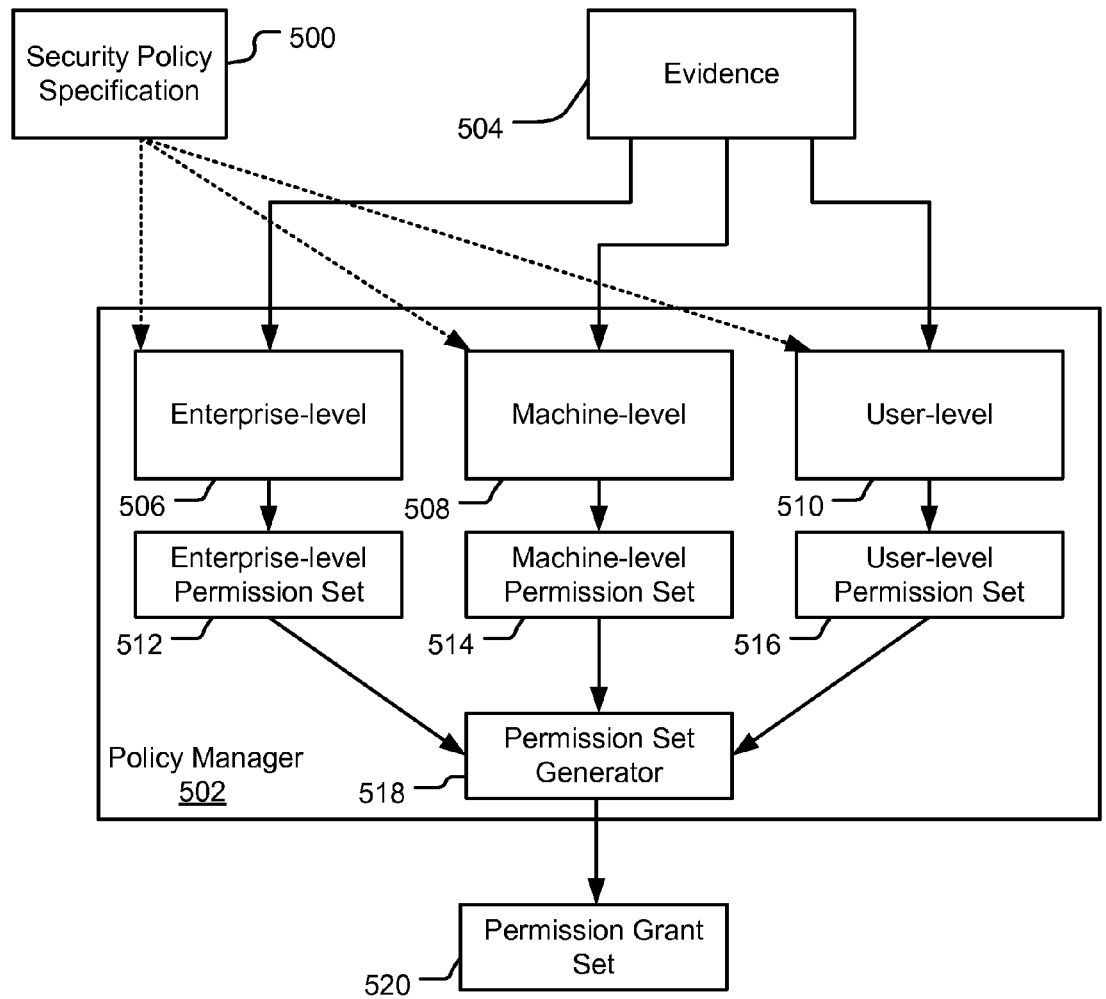
FIG. 5 depicts exemplary policy-levels on which a policy manager operates in an embodiment of the present invention.

An example of the utility of the policy-level permission set selector 426 may be illustrated in a security configuration having a policy level or code group that supersedes all other policy levels or code groups (see the Exclusive property described relative to FIG. 5). In this manner, a merger operation may not be required because the other policy levels may be deemed irrelevant or to be ignored. In at least these configurations, the policy-level permission set generator 418 may generate a permission grant set 414 based on code-group permission sets. It should be understood that the policy-level permission set generator 418 may include a policy-level permission set merger 424, a policy-level permission set selector 426, an alternative generator component, or a combination of these components.

FIG. 5 depicts exemplary policy-levels on which a policy manager operates in an embodiment of the present invention. A security policy specification 500 is processed on the policy manager 502 to generate one or more security policy levels 506, 508, and 510 (this processing is represented by the dotted lines pointing to each of the policy levels). In an embodiment of the present invention, the security policy specification 500 is written as an XML (eXtensible Markup Language) expression. In alternative embodiments, however, other data formats may be employed, including without limitation SGML (Standard Generalized Markup Language), HTML (HyperText Markup Language), RDF (Resource Description Framework), Visual Basic, and other standard and customized data and code formats.

In an embodiment of the present invention, the security policy specification 500 is a persistent representation of a security policy (e.g., an ordered collection of policy levels and/or code group collection), wherein each policy level is constructed of code groups. Lower order policy levels generally specify more restrictive policy restrictions than those of higher order policy levels. The security policy specification 500 is typically generated by a system administrator, a user, or an application setup program having appropriate permissions. Exemplary policy levels may include without limitation enterprise, machine, user, and application policy levels.

In one embodiment of the present invention, the highest level policy level is an enterprise policy level, which may define the security policy applied to all systems within any given enterprise. A lower policy level is a machine policy level, which may define the security policy applied to all users on a given system. A user policy level may define the security policy applied to a given user, regardless of which individual system the user is logged in to. An application policy level may define a security policy applied to a given application, regardless of the user or system executing the application. Additional policy levels and policy level orders are contemplated within the scope of the present invention.

The security policy specification 500 also manages security using a code group collection (e.g., hierarchical collection of code group levels), which are defined by membership conditions and contain or generate permission sets and special attributes. The security policy specification 500 consists of declarations of code groups with associated sets of permissions. A code assembly that is a member of a given code group may be granted permissions from the permission set associated with the code group. Code group membership is determined by the policy manager 502 using evidence set 504 associated with the code assembly, such as a digital signature, the origin of the code assembly, etc. An administrator may add a code group to the code group collection in order to grant additional permissions to code assemblies belonging to the new code group.

In an embodiment of the present invention, a code group may be attributed with an "Exclusive" property flag, which specifies that only the permissions associated with this particular code group are to be applied to the member code assembly. Permission sets from other member code groups are ignored (i.e., not merged). Note that the code-group permission set selector 422 of FIG. 4 may be used to select only the permission set for the "exclusive" code group.

In an embodiment of the present inventions, code groups are defined in a code group hierarchy having a root node corresponding to "all" code assemblies. The root node represents a parent code group having child nodes, each of which may also have child nodes, and so on, to form a code group hierarchy. Alternative code group collections and hierarchies are also contemplated within the scope of the present invention including without limitation ordered and unordered lists of code groups. If the policy manager 502 determines a code assembly is a member of a parent code group, then the code assembly is tested against the children of the parent code group to determine membership therein. Exemplary code group types and membership criteria are described in Table 2, although other code group types are contemplated within the scope of the present invention. Furthermore, code group types may be associated with a property. For example, a code group type "software publisher" may be associated with a specified publisher, "Microsoft", as in "Publisher: Microsoft".

TABLE 2

Exemplary Code Groups

| Code Group Types (label) | Membership Criterion Description |
|---|---|
| all code ("All Code") | All code assemblies are deemed members of this code group. |
| software publisher ("Publisher") | Code assemblies published by a specified publisher (e.g., Microsoft) and verified with a public key of a valid AUTHENTICODE signature are deemed members of this code group. |
| Zone ("Zone") | Code assemblies originating from a specified zone of origin (e.g., Internet, LocalIntranet, RestrictedSites, etc.) are deemed members of this code group. |
| strong name ("Name") | Code assemblies having a specified cryptographically signed name space (e.g., MS.Windows) are deemed members of this code group. |
| web site ("Site") | Code assemblies originating from a specified web site (e.g., www.microsoft.com or *.microsoft.com, where "*" represents a wildcard character) are deemed members of this code group. |
| URL ("URL") | Code assemblies originating from a specified resource location that includes a final wildcard character "*" (e.g., http://www.microsoft.com/app/*) are deemed members of this code group. |

Furthermore, the security policy specification 500 may define multiple policy levels. In the illustrated embodiment, each policy level (e.g., enterprise-level 506, machine-level 508, and user-level 510) has an individual code group hierarchy. As previously discussed, other policy level configurations may be employed within the scope of the present invention, such as a configuration in which multiple policy levels are allocated across one or more code group collections. For example, a single code-group hierarchy may have a single root node associated with multiple children, wherein each policy level is allocated to one child of the root node and the child's associated subtree.

In the illustrated embodiment, a policy-level permission set (e.g., enterprise-level permission set 512, machine-level permission set 514, or user-level permission set 516) is generated from each of the policy levels, such as by a code-group permission set merger 420 or a code-group permission set selector 422 of FIG. 4. A policy-level permission set merger 518 merges the policy-level permission sets 512, 514, and 516 to generate the permission grant set 520.

In an alternative embodiment, the policy-level permission set merger 518 may be replaced or supplemented by a policy-level permission set selector (not shown) to provide an alternative policy-level permission set generator. For example, in an embodiment of the present invention, a code-group permission set associated with an "exclusive" code group may supersede policy-level permission sets of other policy levels. As such, a policy-level permission set selector may be employed to select the code-group permission set associated with the "exclusive" code group, ignoring the policy-level permission sets of the other policy levels.

FIG. 6 illustrates an exemplary code group hierarchy 601 in an embodiment of the present invention. The names of code groups represent classes of code. Each code group is associated with a code-group permission set and an optional child definition. In an embodiment of the present invention, all code assemblies are members of the "All" code group 600 (i.e., the root node in FIG. 6). Permissions that would be granted to any code assembly are included in the permission set associated with the "All" code group. In one embodiment of the present invention, the permission set associated with the "All" code group specifies no permissions (i.e., an empty set).

Each code assembly is evaluated against the membership criterion of each child of the "All" code group, which are specified by the child definition of the "All" code group. As illustrated, the "All" code group in FIG. 6 has four child code groups: "Publisher:Microsoft" 602, "Zone:Internet" 604, "Zone:Intranet" 606, and "Site:*.xyz.com". The code group 602 has two child code groups: "Name:MS.Office" 610 and "Name:MS.Windows" 612. The code group 606 has two child code groups: "Publisher:CorpAdmin" 614 and "Site:*.LocalWeb.com" 616.

Membership evaluation of code groups begins at the top of the code group hierarchy 601. All code assemblies are members of the "All" code group 600 (i.e., the root node). Accordingly, the code assembly, based on its associated evidence, is evaluated for membership in each of the child code groups of the "All" code group 600. For each child code group for which the code assembly is a member, the code assembly, based upon its associated evidence, is evaluated for membership in each of the children of that child code group. For example, a code assembly would be deemed a member of the code group 608 if the code assembly was downloaded from a web site having a URL matching "*.xyz.com", where "*" is a wildcard character. If a code assembly is not deemed a member of a code group, it is not necessary to evaluate the code assembly against any descendents of the code group. The membership evaluation continues as the policy manager traverses the code group hierarchy.

The specific configuration of code groups in a code group hierarchy allows a security policy to be partitioned and refined. That is, an administrator can architect a security policy to meet specific needs by configuring the code group hierarchy to reflect these needs. For example, in illustrated embodiment, an administrator can insert a "Publisher:Microsoft" code group (not shown), and an associated permission set, as a child code group of the "Site:xyz.com" code group 608 to assign permissions for Microsoft-published code assemblies originating at the xyz.com web site. The added code group and permission set does not impact all code assemblies published by Microsoft (corresponding to the code group 602), but only those code assemblies published by Microsoft and originating at the xyz.com web site. This relationship between parent code groups and child code groups represents a logical AND relationship, such that the code assembly is a member of a child code group only if it is a member of both the child code group and the parent code group. In contrast, the relationship between sibling code groups represents a logical OR relationship, such that the code assembly may be a member of one sibling code group, another sibling code group, or both sibling code groups.

A flat code group configuration may also accommodate such refinements, however, a flat code group configuration is much more difficult to manage as the number of code groups grows. Moreover, a code group hierarchy can be easily represented in a graphical user interface to represent the code group relationships, such as in a hierarchical tree view control that is commonly used to display a hierarchical directory structure. A hierarchical code group configuration also provides performance benefits, in that large subtrees of the code group hierarchy may be excluded from further traversal during a membership evaluation (e.g., if a code assembly is not deemed a member of a parent code group).

Figure 7:
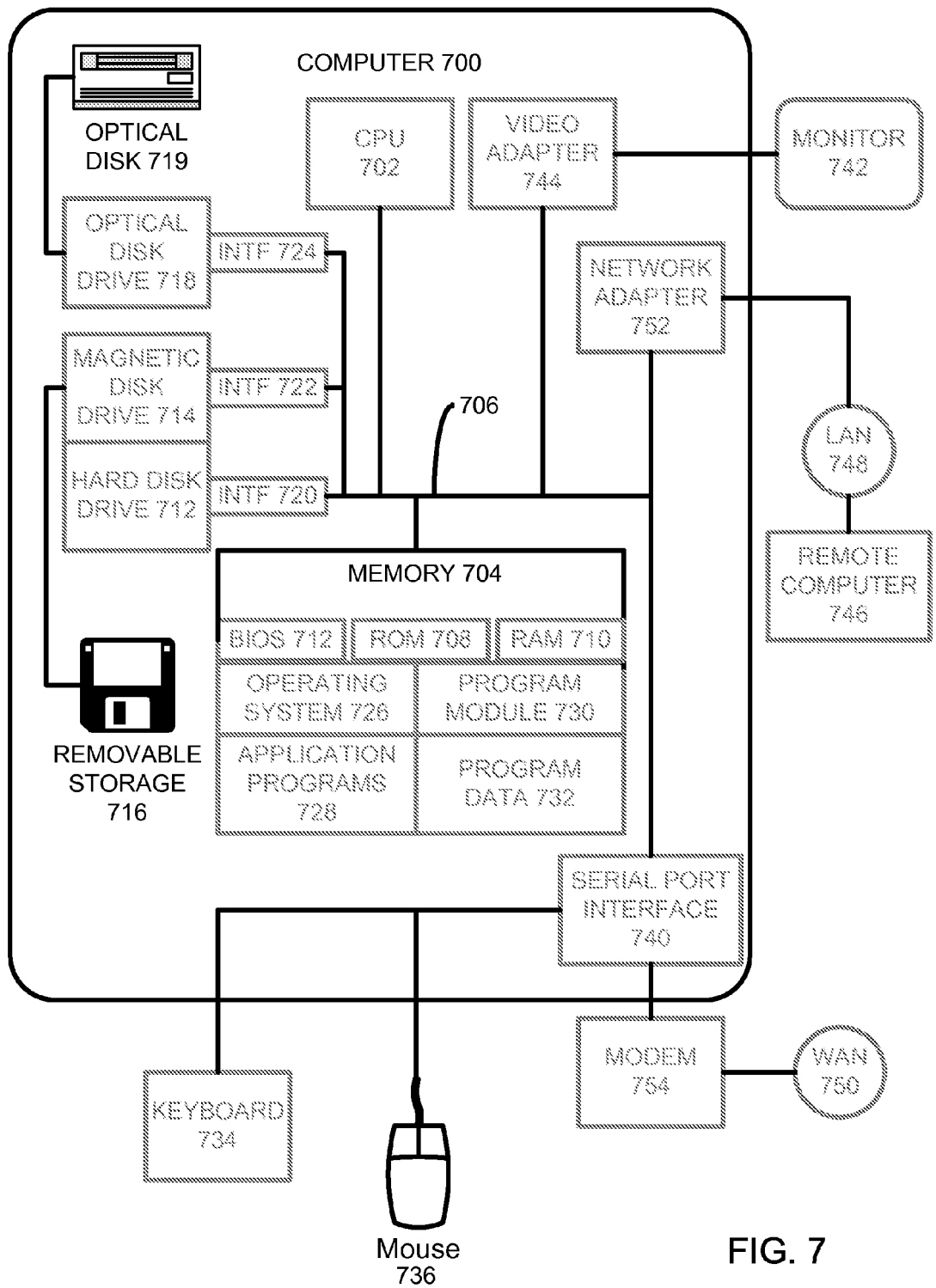
FIG. 7 illustrates an exemplary system useful for implementing an embodiment of the present invention.

FIG. 7 illustrates an exemplary system useful for implementing an embodiment of the present invention. An exemplary computing system for embodiments of the invention includes a general purpose computing device in the form of a conventional computer system 700, including a processor unit 702, a system memory 704, and a system bus 706 that couples various system components including the system memory 704 to the processor unit 700. The system bus 706 may be any of several types of bus structures including a memory bus or memory controller, a peripheral bus and a local bus using any of a variety of bus architectures. The system memory includes read only memory (ROM) 708 and random access memory (RAM) 710. A basic input/output system 712 (BIOS), which contains basic routines that help transfer information between elements within the computer system 700, is stored in ROM 708.

The computer system 700 further includes a hard disk drive 712 for reading from and writing to a hard disk, a magnetic disk drive 714 for reading from or writing to a removable magnetic disk 716, and an optical disk drive 718 for reading from or writing to a removable optical disk 719 such as a CD ROM, DVD, or other optical media. The hard disk drive 712, magnetic disk drive 714, and optical disk drive 718 are connected to the system bus 706 by a hard disk drive interface 720, a magnetic disk drive interface 722, and an optical drive interface 724, respectively. The drives and their associated computer-readable media provide nonvolatile storage of computer readable instructions, data structures, programs, and other data for the computer system 700.

Although the exemplary environment described herein employs a hard disk, a removable magnetic disk 716, and a removable optical disk 719, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 716, optical disk 719, ROM 708 or RAM 710, including an operating system 726, one or more application programs 728, other program modules 730, and program data 732. A user may enter commands and information into the computer system 700 through input devices such as a keyboard 734 and mouse 736 or other pointing device. Examples of other input devices may include a microphone, joystick, game pad, satellite dish, and scanner. These and other input devices are often connected to the processing unit 702 through a serial port interface 740 that is coupled to the system bus 706. Nevertheless, these input devices also may be connected by other interfaces, such as a parallel port, game port, or a universal serial bus (USB). A monitor 742 or other type of display device is also connected to the system bus 706 via an interface, such as a video adapter 744. In addition to the monitor 742, computer systems typically include other peripheral output devices (not shown), such as speakers and printers.

The computer system 700 may operate in a networked environment using logical connections to one or more remote computers, such as a remote computer 746. The remote computer 746 may be a computer system, a server, a router, a network PC, a peer device or other common network node, and typically includes many or all of the elements described above relative to the computer system 700. The network connections include a local area network (LAN) 748 and a wide area network (WAN) 750. Such networking environments are commonplace in offices, enterprise-wide computer networks, intranets, and the Internet.

When used in a LAN networking environment, the computer system 700 is connected to the local network 748 through a network interface or adapter 752. When used in a WAN networking environment, the computer system 700 typically includes a modem 754 or other means for establishing communications over the wide area network 750, such as the Internet. The modem 754, which may be internal or external, is connected to the system bus 706 via the serial port interface 740. In a networked environment, program modules depicted relative to the computer system 700, or portions thereof, may be stored in the remote memory storage device. It will be appreciated that the network connections shown are exemplary, and other means of establishing a communication link between the computers may be used.

In the illustrated embodiment, a security policy specification may be read from a file on the hard disk drive 712, for example, into memory 704. The CPU 702 executes memory-resident instruction code for a computer processes that implement a virtual machine and that generates a permission grant set for a code assembly received from a resource location. Furthermore, the CPU 702 executes the software components that implement the policy manager recited in the claims.

Figure 8:
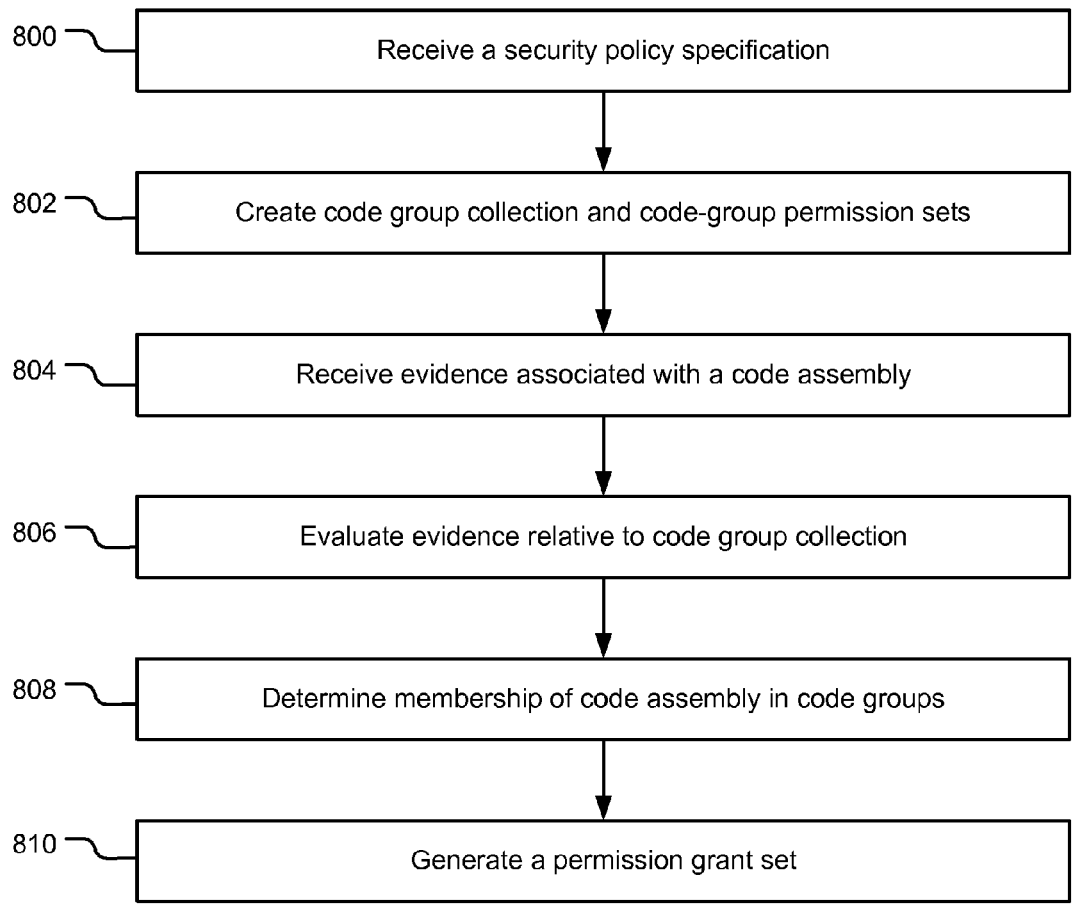
FIG. 8 illustrates a flow diagram of operations for generating a permission grant set for a code assembly received from a resource location in an embodiment of the present invention.

FIG. 8 illustrates a flow diagram of operations for generating a permission grant set for a code assembly received from a resource location in an embodiment of the present invention. A receiving operation 800 receives a security policy specification. A creating operation 802 creates or references one or more code group collections in accordance with a security policy definition extracted from the security policy specification. The creating operation 802 also associates code-group permission sets with appropriate code groups within the one or more code groups collections. The receiving operation 804 receives evidence associated with or related to a code assembly loaded into the run-time environment. An evaluation operation 806 evaluates the evidence relative to the code group hierarchy. A membership operation 808 determines the code groups in which the code assembly is a member based on the membership criterion of each code group. If the evidence of the code assembly satisfies the membership criterion for a group, the code assembly is deemed a member of the code group.

A generating operation 810 generates a permission grant set based on the code-group permission sets of the code groups in which the code assembly is a member. In one embodiment of the present invention, the generating operation 810 is accomplished by a code-group permission set generator (see, for example, the code-group permission set generator 416 in FIG. 4B). In an alternative embodiment, particularly an embodiment in which multiple policy levels are specified by the security policy specification, the generating operation is accomplished by the combination of a code-group permission generator (see, for example, the code-group permission set generator 416 of FIG. 4C) and a policy-level permission set generator (see, for example, the policy-level permission set generator 418 of FIG. 4C).

Figure 9:
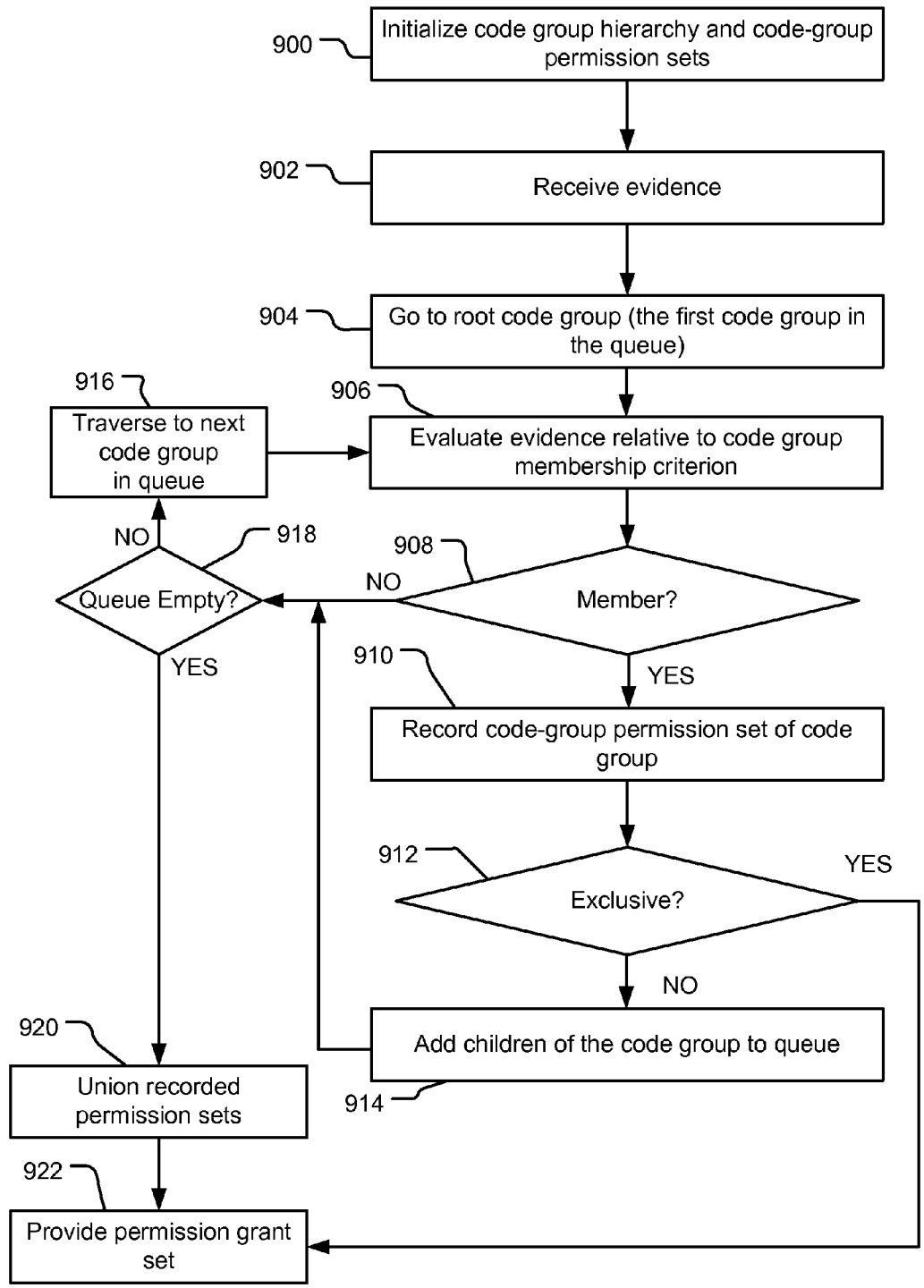
FIG. 9 illustrates a flow diagram of operations for traversing a code group hierarchy in an embodiment of the present invention.

FIG. 9 illustrates a flow diagram of operations for traversing a code group collection in an embodiment of the present invention. A creation operation 900 initializes one or more code group hierarchies and associated code-group permission sets and places the root code group into a traversal queue. A receiving operation 902 receives evidence associated with a code assembly. A traversal operation 904 starts at the root code group (i.e., the first code group in the traversal queue). An evaluation operation 906 evaluates the evidence relative to the membership return of the current code group. For example, a code assembly would be deemed a member of the a code group having a membership criterion of "Site: *.xyz.com", if the code assembly was downloaded from a web site having a URL matching "*.xyz.com", where "*" is a wildcard character. A decision operation 908 directs operation flow to a recording operation 910 if the code assembly is deemed to be a member of the current code group. The recording operation 910 records the code-group permission set of the current code group. Alternatively, the decision operation 910 directs operation flow to a decision operation 918 if the code assembly is not deemed to be a member of the current code group.

After the recording operation 910, a decision operation 912 determines whether the current code group is "Exclusive" (i.e., is associated with an "exclusive" property). If the code group is exclusive, operation flow in one embodiment of the present invention branches to a permission grant operation 922, which provides the exclusive permission set as the permission grant set for the code assembly. If the decision operation 912 determines that the current code group is not exclusive, then queue operation 914 determines the children of the current code group and adds them to the traversal queue before processing proceeds to the decision operation 918.

The decision operation 918 directs operation flow to a traversing operation 916 if the traversal queue is not empty. The traversal operation 916 traverses to the next code group in the traversal queue. Alternatively, the decision operation 916 directs operation flow to a merging operation 920 if the traversal queue is empty. The emerging operation 920 computes the union of the recorded code-group permission sets in an embodiment of the present invention. The permission grant operation 922 then provides the result of the merging operation 920 as the permission grant set.

In an alternative embodiment of the present invention, the code assembly is not permitted to be a member of multiple exclusive code groups. Accordingly, the operations illustrated in FIG. 9 are modified to traverse normally through a code group collection even after an exclusive code group is encountered and a code assembly is deemed to be a member therein. In this embodiment, the permission set associated with the exclusive code group is recorded while the remainder of the traversal is completed or until a second exclusive code group is encountered having the code assembly as a member. An error is reported if the second exclusive to group is encountered. Otherwise, the permission set associated with the first exclusive to group is provided as the permission grant set in permission grant operation 922.

The "exclusive" property can indicate at least one of several possible attributes. In one embodiment of the present invention, the "exclusive" property may designate that, if a code assembly is deemed to be a member of a code group having the "exclusive" property, then only the permission set associated with the "exclusive" code group (and no other permission set) is associated with that code assembly. However, the "exclusive" property may indicate alternative attributes. For example, in an alternative embodiment of the present invention, the "exclusive" property may signify that no other permission sets below the "exclusive" code group may be associated with the code assembly.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

Partial Grant Set Based on Partial Evidence

Determination of a complete permission set may be a computationally expensive operation (i.e., processor and memory usage). In addition, the time in which a system determines the permission set may be longer than the amount of time to execute the downloaded code assembly. In many instances, when certain predefined permissions are present in the permission set, the remaining permissions are unnecessary or irrelevant. For example, if a code assembly has "execute" and "skip verification" permissions, the remaining permissions may be irrelevant to determine whether the code assembly can begin or continue execution. In one aspect of the invention, other relevant permissions for which partial evaluations may be performed include, but are not limited to, whether a code assembly can call out to unmanaged code, whether a code assembly can skip verification when it explicitly requests skip verification rights, and whether a code assembly has full trust rights. In still other aspects of the invention, other permissions may be the basis for a partial evaluation.

Thus, some aspects of the invention provide for execution of a downloaded code assembly with minimal delay and memory usage by determining whether one or more permissions result from a partial evaluation of the evidence presented with the downloaded code assembly. That is, the invention determines whether a specified one or more permissions would be included in a resultant permission set if a full evaluation were performed, without performing the full evaluation. The policy manager may perform a partial policy evaluation, determine whether the partial evaluation is sufficient for the current permission, and only if necessary perform a full evaluation.

Figure 10:
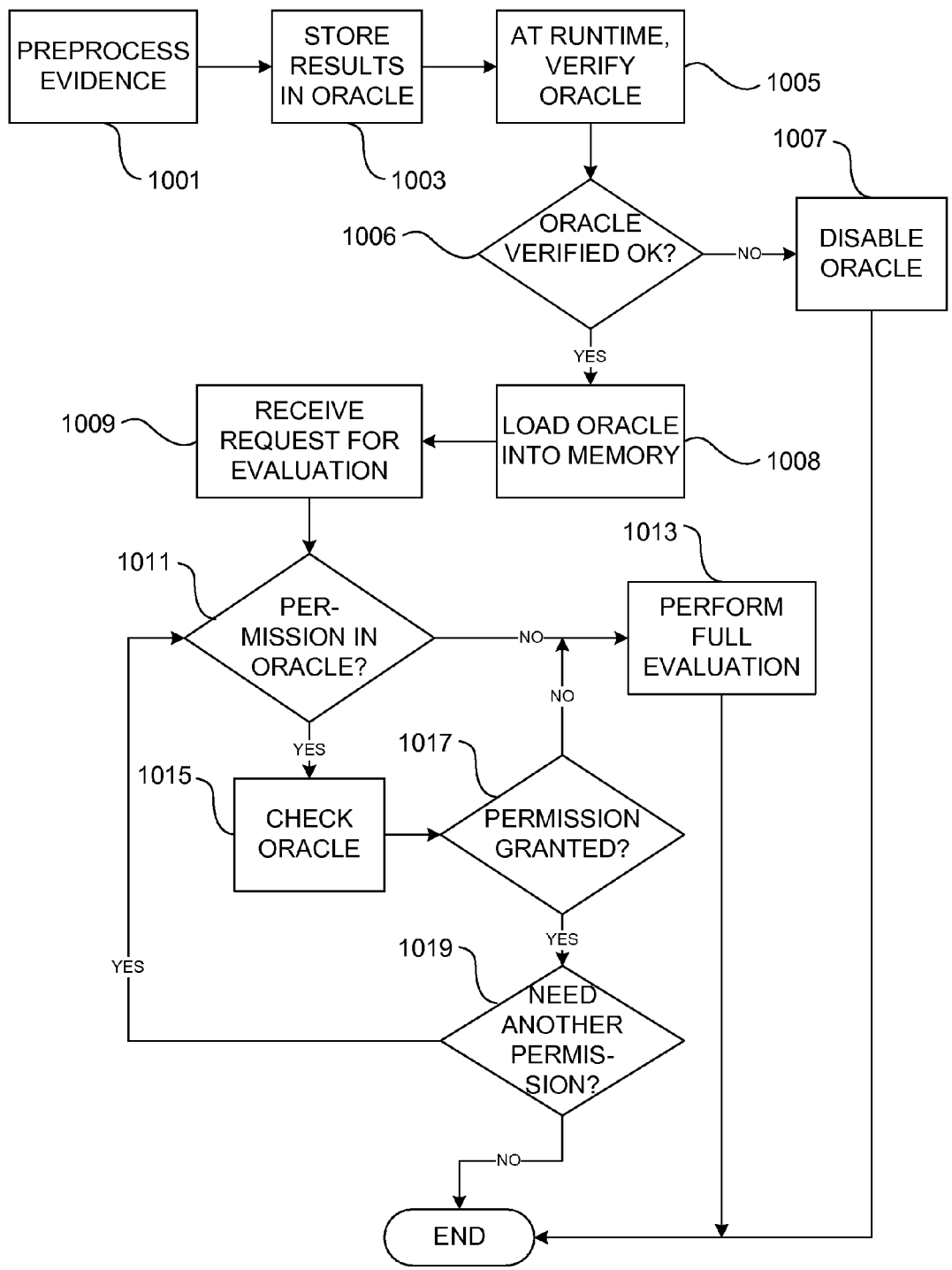
FIG. 10 illustrates a flow diagram of operations for evaluating a partial evidence set to determine a partial permission set grant.

In one aspect of the invention, with reference to FIG. 10, the policy manager (or other module, depending on implementation) preprocesses all or part of the security policy to create an oracle that includes a mapping between partial evidence sets and partial permission grant sets. Subsequent partial evidence sets may then be evaluated with respect to the oracle.

In step 1001, the policy manager preprocesses the security policy. For example, the policy manager may create an oracle based on an empty evidence set to determine whether all code receives one or more permissions regardless of the evidence presented by the code assembly, as well as create an oracle based on each of one or more values of a determinative piece of evidence (e.g., security zones used by the system). The security zones may include MyComputer, Internet, LocalIntranet, TrustedSites, and UntrustedSites. More, fewer, or different security zones may alternatively be used, depending on system architecture, design considerations, and the like. For each security zone, grant set rights may be determined for one or more predetermined permissions, such as execution rights, unmanaged code execution rights, skip verification rights, rights to skip verification if explicitly requested, and full trust rights. Again, more or fewer permissions may be evaluated. For instance, the permissions for which rights may be determined may include a dynamic set of permissions or a single permission provided by an oracle constructed from profiler data. In addition, the evidence evaluated to determine whether the permission(s) result may include one or more pieces of evidence. Some aspects of the invention use a single piece of evidence (e.g., zone of origin) to determine resultant permissions. Other aspects of the invention use multiple pieces of evidence to determine resultant permissions.

In step 1003, the policy manager creates the oracle, for example, by storing the results in the security policy cache file. The results may be stored as a bitmap, where each bit corresponds to a zone/permission combination. Based on the above example, the oracle may be stored as 30 significant bits in a 32 bit block (i.e., six zones*five permissions=30 significant bits) in the security policy cache file. Alternatively, the oracle data may be stored in a different file or in its own file.

Steps 1001 and 1003 may optionally be repeated (not shown) for each persisted policy level (e.g., enterprise, machine, user), thus resulting in three separate data stores that make up the oracle. Additional, fewer, or different policy levels may alternatively be used (e.g., based on time, application, etc.).

The oracle is created such that if it is known that the permission will exist based on the partial evidence set, the corresponding bit is set in the oracle's bitmap. However, if it is not known (e.g., because an exclusive code group exists in the code group hierarchy, such as is shown in FIG. 6) or it is known that the permission will not be present, the corresponding bit is not set in the bitmap. Thus, if a bit corresponding to a permission is not set, the system does not know whether the permission is granted or not, and the system may perform a full evaluation to make this determination as needed.

In step 1005, at runtime, the oracle data is checked for consistency. That is, the policy manager may verify that the oracle data is accurate with respect to future instances of the permission tree (e.g., because an administrator changed permissions in the code group hierarchy) and that the oracle data remains accurate as against the entire hierarchy. The policy manager may verify the oracle data by determining whether the permission sets are based on constant grants, ensuring that the permission grants are not based on evidence itself, and ensure that there are no exclusive code groups.

If the oracle verifies successfully in step 1006, the policy manager proceeds to step 1008. If the oracle does not verify successfully, for example, because one of the code groups is configured to allow exclusive permission sets or because a code group generates a policy statement at runtime, the system proceeds to step 1007. In step 1007, the policy manager disables the oracle and forces a full policy evaluation for each evidence set.

In step 1008, the oracle data is loaded into memory. The oracle data may be stored in a policy level specific data structure in unmanaged code for quick reference. Subsequently, when the system needs to determine whether a permission exists for the code assembly, the system evaluates the evidence against the oracle when the sought permission is one for which the oracle has been created.

In step 1009, the policy manager receives a request to evaluate an evidence set using the security policy manager to determine which rights are granted. The requestor may then use the set of granted rights to determine whether a specific right was granted. This request may come in the form of a code assembly attempting to perform an act which requires a specific permission to do so, such as execute, skip verification, access a resource, etc. The request may include the value of the determinative piece of evidence used by the oracle, e.g., the security zone from which the code assembly originated.

In step 1011, the system determines whether the permission needed is a permission for which the oracle was created. If so, the policy manager proceeds to step 1015 and performs a partial evaluation. If not, the policy manager proceeds to step 1013 where a full evaluation may be performed when necessary.

In step 1015, the policy manager queries the oracle for the bit value corresponding to the empty set/permission combination for the appropriate security level. If the permission is not granted based on the empty set, the policy manager may look up the bit corresponding to the zone/permission combination for the appropriate security level. In step 1017, if the permission is granted, the policy manager proceeds to step 1019. If the permission is not granted, the policy manager may proceed to step 1013 to perform a full evaluation as needed. In step 1019, the policy manager determines whether any other permission has been requested and, if so, returns to step 1011.

By performing partial grant set evaluation based on partial evidence, as described above, the policy manager is not required to traverse the entire code group hierarchy. The policy manager only performs a full evaluation when the partial evidence set does not conclusively determine that a requested permission is present.

While the above example has been described with respect to using the partial evidence set including zone of origin as a basis for determining a partial permission grant set, other partial evidence sets may alternatively be used. For example, an oracle may be created based on a code assembly's publisher, strong name, website, URI (or URL), or any other piece or pieces of evidence as needed. However, because as multiple pieces of evidence are used, the size of the oracle increases exponentially, it is preferable (but not required) to use fewer pieces of evidence. A piece of evidence to use as the basis for a partial grant set determination is preferably a piece of evidence that resolves the most sought after permission(s), such that partial evaluations are performed as often as possible instead of using system resources to perform full evaluations. Partial evaluations may be performed by the systems shown and described above with respect to FIGS. 1-9.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A data processing system, comprising:
a processor; and
a computer readable storage medium storing computer readable instructions that, when executed by the processor, cause the processor to implement:
a policy manager using an evidence based security model that evaluates multiple pieces of evidence using a security policy to determine a set of granted permissions; and
an oracle for determining whether a first permission is granted based on a subset of the multiple pieces of evidence, the subset including less than all of the multiple pieces of evidence,
wherein the policy manager, upon receiving a request for the first permission, queries the oracle to determine whether the first permission is granted based on the subset of the multiple pieces of evidence.

2. The system of claim 1, wherein the oracle comprises a bitmap, and wherein the bitmap comprises bits corresponding to a combination of the first permission and a value of a single piece of evidence.

3. The system of claim 2, wherein each bit in the bitmap comprises a first value when the first permission is granted, and a second value when the first permission is either not granted or unknown.

4. The system of claim 1, wherein, when the oracle indicates that the first permission is not granted or unknown, the policy manager performs a full security policy evaluation based on the multiple pieces of evidence.

5. The system of claim 1, wherein the subset comprises a zone indicator value.

6. The system of claim 5, wherein the zone indicator value includes a local computer, the Internet, a local intranet, trusted web sites, and untrusted web sites.

7. The system of claim 1, wherein the first permission comprises a right of a code assembly to execute.

8. The system of claim 1, wherein the first permission comprises a right of a code assembly to skip verification.

9. The system of claim 1, wherein the first permission comprises a right of a code assembly to call unmanaged code.

10. The system of claim 1, wherein the first permission comprises full trust rights.

11. The system of claim 1, wherein the subset of the multiple pieces of evidence comprises one piece of evidence.

12. In an evidence based security model that evaluates multiple pieces of evidence using a security policy to determine a set of granted permissions, and wherein a code assembly zone of origin determines whether a first permission is granted, and wherein prior to receiving a request to determine whether the first permission is granted, values of the zone of origin have been evaluated using the security policy to determine resultant permissions, and the results have been stored in a bitmap, a computer-implemented method for determining a subset of the permissions, comprising steps of:

(a) upon receiving, at a computing device, a request to determine whether the first permission is granted, wherein the request comprises an instance of the zone of origin, determining whether the first permission is granted based on data stored in the bitmap; and (b) when the first permission is not granted in step (a), performing a full evaluation of the multiple pieces of evidence based on the security policy, wherein the set of values of the zone of evidence includes at least a local computer, the Internet, a local intranet, trusted web sites, and untrusted web sites, and wherein the first permission includes a definition of execution rights, unmanaged code execution rights, skip verification rights, rights to skip verification if explicitly requested, and full trust rights for each value in the set of values of the zone of evidence.

13. The method of claim 12, wherein each bit of the stored results corresponds to a combination of one of the permissions and the set of values of the zone of origin.

14. In an evidence based security model that evaluates multiple pieces of evidence using a security policy to determine a set of granted permissions, and wherein a subset of the multiple pieces of evidence determines whether a subset of permissions is granted, a computer-implemented method for determining the subset of permissions, comprising steps of:
  (a) prior to receiving, at a computing device, a request to determine whether the subset of permissions is granted, evaluating the subset of evidence using the security policy, based on values of evidence contained in the subset of evidence, to determine resultant permissions, wherein the subset of evidence includes less than all of the multiple pieces of evidence;
  (b) storing the results from step (a); and
  (c) upon receiving a request to determine whether the subset of permissions is granted, wherein the request comprises an instance of the subset of evidence, querying the stored results to determine whether the subset of permissions is granted.

15. The method of claim 14, wherein the subset of evidence comprises one piece of evidence.

16. The method of claim 14, wherein the subset of permissions comprises one permission.

* * * * *